March 24, 1942.      H. F. VICKERS ET AL      2,277,570
POWER TRANSMISSION
Original Filed March 30, 1939
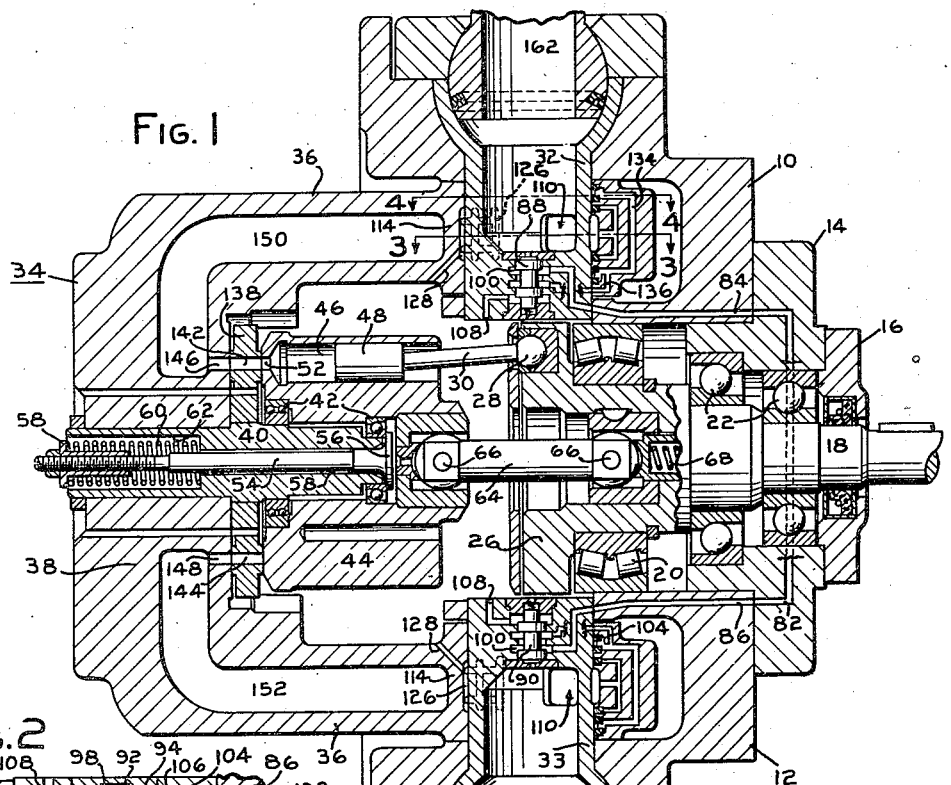
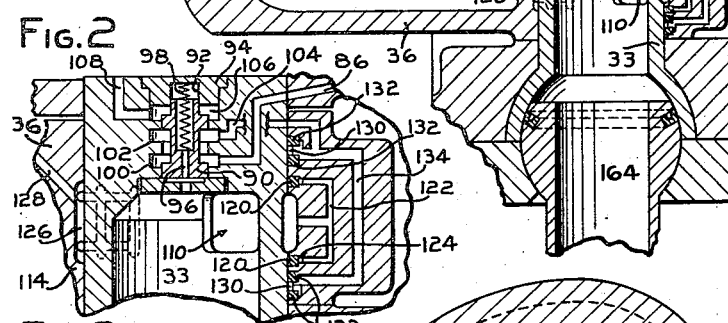
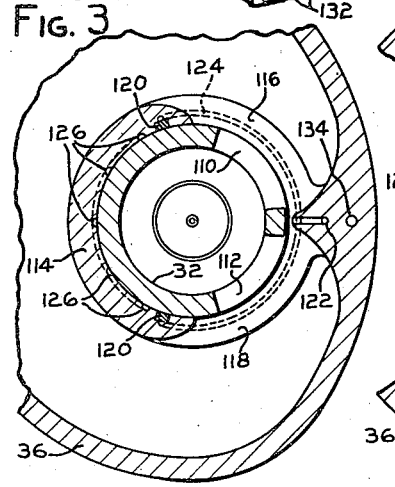
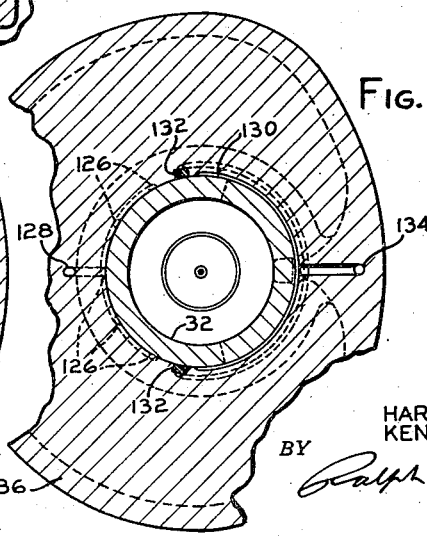
INVENTORS
HARRY F. VICKERS &
KENNETH R. HERMAN
BY
*Ralph L. Tweedale*
ATTORNEY Patented Mar. 24, 1942

2,277,570

UNITED STATES PATENT OFFICE 2,277,570

POWER TRANSMISSION

Harry F. Vickers and Kenneth R. Herman, Detroit, Mich., assignors to Vickers Incorporated, Detroit, Mich., a corporation of Michigan Original application March 30, 1939, Serial No. 265,012. Divided and this application November 8, 1940, Serial No. 364,778

9 Claims. (Cl. 103—162)

This invention relates to power transmissions, particularly to those of the type comprising two or more fluid pressure energy translating devices, one of which may function as a pump and another as a fluid motor.

This application is a division of application Serial No. 265,012, filed March 30, 1939.

The present invention is particularly concerned with fluid pressure energy translating devices of the fixed or variable displacement type and is particularly applicable to those of the class wherein the load forces generated by fluid pressure within the device are carried by the drive shaft and casing largely in the axial direction with respect to the shaft. As an example of a pump or motor of this general class, reference may be had to the patent to Thoma, 1,931,969. In devices of this general character the pintle bearing for the two-armed yoke has been such as to impose high stresses on the yoke due to the reaction of fluid pressure forces both in a direction axially of the pintle and also radially thereof. The present tendency in the art is toward increasingly higher pressures, and it has been found that the pintle construction previously used is not capable of use with high pressures since these thrust forces uniformly cause breakage. In addition, at higher pressures it has been found that the turning resistance of the pintle construction becomes excessive due to the friction imposed by the high thrust forces acting radially of the pintle.

It is an object of the present invention, therefore, to provide an improved pump or motor construction wherein the fluid pressure forces acting on the yoke are balanced out thus relieving the breaking stresses on the yoke itself and eliminating excessive friction in the pivot thereof.

It is also an object to provide a pump or motor of improved and more rugged, compact, and reliable construction, capable of satisfactory operation over a long useful life at extremely high pressures and high speeds.

Further objects and advantages of the present invention will be apparent from the following description, reference being had to the accompanying drawing wherein a preferred form of the present invention is clearly shown.

In the drawing:

Figure 1 is a transverse cross section of a variable displacement pump or motor incorporating a preferred form of the present invention.

Figure 2 is a fragmentary cross section on an enlarged scale showing one portion of the mechanism of Figure 1.

Figure 3 is a fragmentary cross section on line 3—3 of Figure 1.

Figure 4 is a fragmentary cross section on line 4—4 of Figure 1.

Referring now to Figure 1 there is illustrated a pump of the variable displacement type having a generally cup-shaped main frame or casing member 10 having suitable flange means 12 for attachment to a support such as the wall of an oil tank. The main drive shaft 18 of the device is journalled on self-aligning, radial, anti-friction bearings 20 in the main frame 10 and on combined radial and thrust bearings 22 in a bearing support 14. A seal for the projecting end of the shaft is provided by the closure member 16. At its lefthand end the shaft 18 is provided with a flange portion 26 which carries a plurality of ball and socket joints 28 by which connecting rods 30 are articulated to the flange 26.

Journalled on stationary hollow trunnions 32 and 33 in the main frame member 10 is a swinging yoke 34 having a pair of hollow arms 36 at opposite sides thereof and a valve plate portion generally designated as 38 intermediate the two arms 36. Journalled in the yoke 34 on a stub shaft 40 which is rigidly secured thereto and on anti-friction bearings 42 is a cylinder barrel 44. The bearings 42 are preferably axially slidable on the stub shaft 40.

The cylinder barrel 44 has a plurality of cylinder bores 46 in which pistons 48 are reciprocably mounted. The pistons are articulated to the connecting rods by ball joints similar to the joints 28. At their lefthand ends each of the cylinder bores 46 is provided with a cylinder port 52 opening to the lefthand face of the barrel 44 and cooperating with the valve plate of the yoke 34 in the well-known manner. In order to yieldably retain the cylinder barrel 44 against the valve plate, a stem 54 having a mushroom-shaped head 56 at its righthand end is slidably mounted in a bore 58 formed in the stub shaft 40, the mushroom head 56 abutting the inner right race of the righthand bearing 42. The lefthand portion of the stem 54 is threaded to adjustably carry a spring abutment 58. A spring 60 is mounted in an enlarged bore 62 at the lefthand end of the stub shaft 40 and serves to constantly urge the stem 54 and cylinder barrel 44 to the left.

The drive shaft 18 and the cylinder barrel 44 are connected together for conjoint rotation by means of a shaft 64 having universal joints 66 at its opposite ends which are connected respectively to the cylinder barrel 44 and the shaft 18.

A light spring 68 urges the shaft 64 to the left to take up any lost motion in the axial direction inherent in the universal joints 66.

The inner ends of the trunnions 32 and 33 are closed off from the interior of the casing 10, as shown, and each carries a spring-loaded, pressure responsive, four-way valve 88 and 90. These valves have one port thereof connected together by a cross conduit 82 in the bearing member 14 having portions 84 and 86 extending through the frame member 10.

The construction of the valves 88 and 90 are each identical and that of the valve 90 is more clearly shown in Figure 2. The lower end of the valve 90 is of a somewhat larger diameter than the upper end which slides in a bore 92 in a cap 94. A central passage 96 through the valve places the bore 92 in communication with the hollow interior of the trunnion 33 so that a differential area of the valve 90 is exposed to the pressure in the trunnion 33. A spring 98 opposes this pressure. The conduit 86 extends into the closed end of the trunnion 33 and connects with a port 100. A port 102 connects with a conduit 104 for a purpose later to be described. A port 106 connects by a conduit 108 with the interior of the casing member 10.

It will be seen that in the position of the valve 90 shown in Figures 1 and 2, that is, when the pressure in trunnion 33 is not sufficiently higher than that within the casing 10 to overcome the spring 98, ports 100 and 102 are connected together and are cut off from the trunnion 33 and conduit 108, respectively. When the pressure in trunnion 33 rises sufficiently to overcome spring 98, valve 90 moves upwardly cutting off port 100 from port 102 and placing port 100 in communication with the interior of trunnion 33 as well as connecting port 102 with port 106. Thus pressure oil from trunnion may be admitted to the conduit 86 and transmitted through conduits 82 and 84 to the port 100 of valve 88. Normally only one of the valves 88 or 90 is open at one time so that pressure oil transmitted through conduit 86, for example, cannot escape to the opposite trunnion 32 through the valve 88.

The bearing construction at the trunnions 32 and 33 includes an improved means for balancing the radial loads on the bearing hydraulically and for insuring that no loads are transmitted to the yoke arms 36 in a direction axially of the trunnions. For this purpose each of the trunnions is provided with a pair of radially opening ports 110 and 112 which extend through an arc somewhat less than 180 degrees facing to the right in Figure 1. The disposition of these ports is illustrated in Figure 3. The arms 36 are provided with bearing portions 114 which surround the trunnions. There is formed in each of these bearing portions a pair of ports 116 and 118 which register with the ports 110 and 112. The ports 116 and 118 extend through an arc of approximately 180 degrees.

Around the periphery of the ports 116 and 118 there is provided a flexible packing member which is formed as an endless band 120 of generally rectangular shape with rounded corners to completely encompass the ports 116 and 118. This packing may be made of a suitable material such as leather or Neoprene. The rear faces of the packings 120 are in communication with their respective ports 116—118 through drilled passages 122, a groove 124 being provided in the packing receiving recess for distributing the oil pressure around the entire back face of the packing 120. The projected area enclosed by the packing 120 is chosen so that the radial force due to fluid pressure tending to move the arm 36 to the right in Figure 1 is equal to that portion of the load imposed on the trunnion 32 or 33 by the thrust of the pistons 48.

Diametrically opposite the ports 110 and 112 the bearing portion 114 is provided with pressure relieving grooves 126 which cover a generally comparable area to that of the ports 110 or 112 and which communicate by bores 128 with the interior of the casing member 10. To either side of the ports 116 and 118 in the bearing portions 114 there are provided in each bearing portion a pair of balancing grooves 130 (see Figures 2 and 4). These grooves 130 are surrounded with peripheral packing members 132 similar in construction to the packing members 120. Suitable drilled conduits 134 connect the balancing grooves 130 and the back face of packings 132 with the conduit 104 at trunnion 33 and with a similar conduit 136 at trunnion 32. The area enclosed by the two packing members 132 at either trunnion 32 or 33 is preferably so chosen that the fluid pressure force exerted therein tending to urge the arm 36 to the right in Figure 2 is equal to the portion of the piston thrust load carried by that trunnion when the other trunnion is on the pressure side of the machine.

It will be understood, of course, that the trunnion load produced by the thrust of pistons 48 is not equal on both trunnions. Thus in Figure 1, if we assume that the trunnion 32 is under pressure and the trunnion 33 is not, this means that the pistons 48 which are in the top half of Figure 1 are subject to pressure while those at the bottom half of Figure 1 are not. Thus the center of pressure of the total piston thrust is somewhat above the axis of stub shaft 40, imposing a greater load on trunnion 32 than on trunnion 33. The areas of the balancing grooves 130 are preferably chosen so as to carry the approximate proportion of the piston thrust which is exerted on the trunnion not under pressure.

Due to the inherent constructional requirements of the yoke 34, it is preferable to make this part by casting, and in order to provide a more wear-resisting material than can be readily cast, the valve plate portion 38 of the yoke 34 carries a removable wearing plate 138 which is secured to the righthand face of the portion 38. The plate 138 carries the usual pair of arcuate valve ports 142 and 144 which cooperate with the cylinder ports 52 in the well-known manner. These ports register with corresponding ports 146 and 148 formed in the valve plate portion 38 of yoke 34 which communicate with passages 150 and 152 leading to the trunnion bearings 114.

The general operation of the structure thus far described is well known in the art. Briefly stated, rotation of the shaft 18 and cylinder barrel 44 causes the pistons 48 to be reciprocated in the bores 46 through a stroke depending upon the angular setting of the yoke 34 relative to the shaft 18. With the yoke 34 in neutral position, that is, with the barrel 44 aligned with shaft 18, the pistons will not be reciprocated at all and no fluid will be pumped, whereas if the yoke be swung to its limit of movement, the piston stroke will be at a maximum causing oil to be delivered through the ports 52 into the valve plate port 142, for example, and delivered through passage 150 and trunnion 32 to the main line conduit 162.

As each cylinder comes into register with the opposite valve plate port 144, fluid is drawn in therethrough from the passage 152 and the main line conduit 164.

In thus delivering oil against a high pressure head, heavy radial loads would be imposed on the trunnions 32—33 were it not for the provisions for balancing these loads. These loads at the trunnions 32 and 33 are hydraulically balanced so that the yoke is free swinging. In this connection, if we consider the trunnion 32 as being under pressure, it will be seen that the ports 112 and 118 balance the radial load imposed on trunnion 32 while the auxiliary balancing grooves 130 at trunnion 33 balance the smaller load on that trunnion. It will be noted that the auxiliary balancing grooves are supplied with pressure from the opposite trunnion 32 rather than with the low side pressure existing in trunnion 33. This arises from the fact that valve 88 will shift due to the pressure in trunnion 32 connecting port 100 to the interior of trunnion 32. Pressure is thus transmitted through conduits 82, 84 and 86 to the port 100 of valve 90. This valve, being on the low side of the device, remains in its upper position permitting pressure oil to flow to port 102 and through conduit 104 to the auxiliary balancing grooves 130 and trunnion 33. At the same time, the shifting of valve 88 connects ports 102 and 106 thus connecting balancing grooves 130 at trunnion 33 with the tank through conduit 108.

Due to the fact that the trunnions 32 and 33 are rigidly secured to the casing member 10 and further due to the fact that the arms 36 embrace the trunnions over equal areas at the top and bottom of each arm in Figure 2, there is no force transmitted to the arms 36 in a direction axially of the trunnions. In machines where this construction is not provided, it will be seen that a fluid pressure force would be exerted on the yoke as a whole equal to the cross section of the pressure conduit 164 multiplied by the operating pressure, and this force would be transmitted through the yoke to the casing at the opposite trunnion. In the present construction this force, due to hydraulic pressure existing in the main line 162, for example, is carried directly by the casing itself, thus further reducing the frictional resistance to turning of the yoke 34.

While the form of embodiment of the invention as herein disclosed constitutes a preferred form, it is to be understood that other forms might be adopted, all coming within the scope of the claims which follow.

What is claimed is as follows:

1. In a fluid pressure energy translating device of the type having a swinging two-armed yoke for varying the displacement of the device and having fluid inlet and exhaust passages formed therein, the combination with a casing for the device of a pintle bearing construction including a pair of hollow pintles stationarily mounted on the casing and forming journals on which the yoke may swing, and means forming fluid ports between the hollow pintles and the fluid passages in the yoke, said ports opening to the passages solely in a radial direction with respect to the pintles whereby the net fluid pressure force on the yoke in a direction axially of the pintles is substantially balanced.

2. In a fluid pressure energy translating device of the type having a swinging two-armed yoke for varying the displacement of the device and having fluid inlet and exhaust passages formed therein, the combination with a casing for the device of a pintle bearing construction including a pair of hollow pintles stationarily mounted on the casing and forming journals on which the yoke may swing, and means forming fluid ports between the hollow pintles and the fluid passages in the yoke, said pintles extending through the arms of the yoke with an equal bearing area at both sides of each arm whereby the axial fluid pressure force acting at each pintle is transmitted to the casing directly and independently of the yoke.

3. In a fluid pressure energy translating device of the type having a swinging two-armed yoke member for varying the displacement of the device and having fluid inlet and exhaust passages formed therein, the combination with a casing member for the device of a pintle bearing construction including a pair of hollow pintles forming a pivotal mounting for said yoke member, said pintles extending from opposite sides of each yoke arm with equal cross sectional areas whereby the axial fluid pressure forces at the pintle are balanced with respect to the yoke.

4. In a fluid pressure energy translating device of the type having a swinging two-armed yoke member for varying the displacement of the device and having fluid inlet and exhaust passages formed therein, the combination with a casing member for the device of a pintle bearing construction including a pair of hollow pintles stationarily mounted on one member and forming journals for said yoke member, and balancing ports associated with said pintles and connected with said passages for balancing at least a portion of the radial loads transmitted from the yoke to the casing.

5. In a fluid pressure energy translating device of the type having a swinging two-armed yoke member for varying the displacement of the device and having fluid inlet and exhaust passages formed therein, the combination with a casing member for the device of a pintle bearing construction including a pair of hollow pintles stationarily mounted on one member and forming journals for said yoke member, and balancing ports associated with said pintles and connected with said passages for balancing at least a portion of the radial loads transmitted from the yoke to the casing, said balancing ports being formed to provide unequal balancing forces at opposite pintles.

6. In a fluid pressure energy translating device of the type having a swinging two-armed yoke member for varying the displacement of the device and having fluid inlet and exhaust passages formed therein, the combination with a casing member for the device of a pintle bearing construction including a pair of hollow pintles stationarily mounted on one member and forming journals for said yoke member, balancing ports associated with said pintles and connected with said passages for balancing at least a portion of the radial loads transmitted from the yoke to the casing, said balancing ports being formed to provide unequal balancing forces at opposite pintles, and means for selectively transposing connections of said balancing ports with respect to the passages in said yoke.

7. In a fluid pressure energy translating device of the type having a swinging two-armed yoke member for varying the displacement of the device and having fluid inlet and exhaust passages formed therein, the combination with a casing member for the device of a pintle bearing construction including a pair of hollow pintles stationarily mounted on one member and forming journals for said yoke member, balancing ports associated with said pintles and connected with said passages for balancing at least a portion of the radial loads transmitted from the yoke to the casing, said balancing ports being formed to provide unequal balancing forces at opposite pintles, and means for selectively transposing connections of said balancing ports with respect to the passages in said yoke.

8. In a fluid pressure energy translating device of the type having a swinging two-armed yoke for varying the displacement of the device and having fluid inlet and exhaust passages formed therein, the combination with a casing for the device of a pintle bearing construction including a pair of hollow pintles forming journals on which the yoke may swing, means on the casing for supporting each pintle on both sides of each yoke arm, and fluid passages connecting between the hollow pintles and the yoke arms.

9. In a fluid pressure energy translating device of the type having a swinging two-armed yoke for varying the displacement of the device and having fluid inlet and exhaust passages formed therein, the combination with a casing for the device of a pintle bearing construction including a pair of hollow pintles forming journals on which the yoke may swing, and means on the casing for supporting each pintle, said means including a combined pintle supporting boss and fluid connection disposed laterally outward of each yoke arm and a pintle supporting lug formed on the casing laterally inward of each yoke arm.

HARRY F. VICKERS.
KENNETH R. HERMAN.